Dec. 31, 1940. D. P. KILLEN 2,226,615
AUTOMOBILE DOOR BUMPER, SILENCER, AND DUST SEAL
Filed Aug. 16, 1939
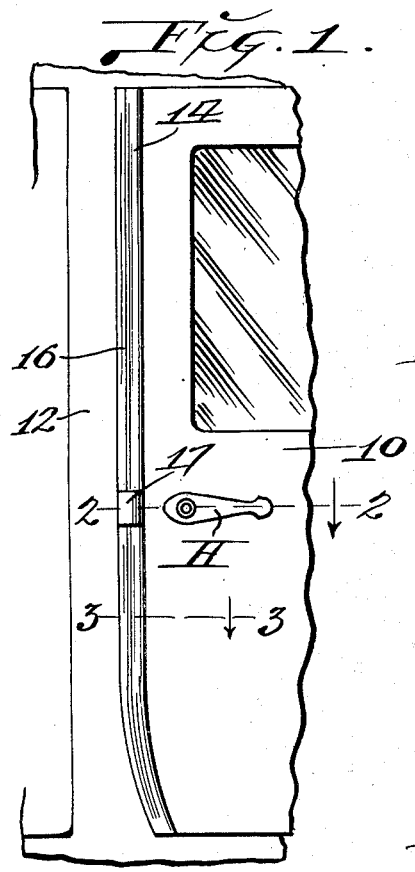
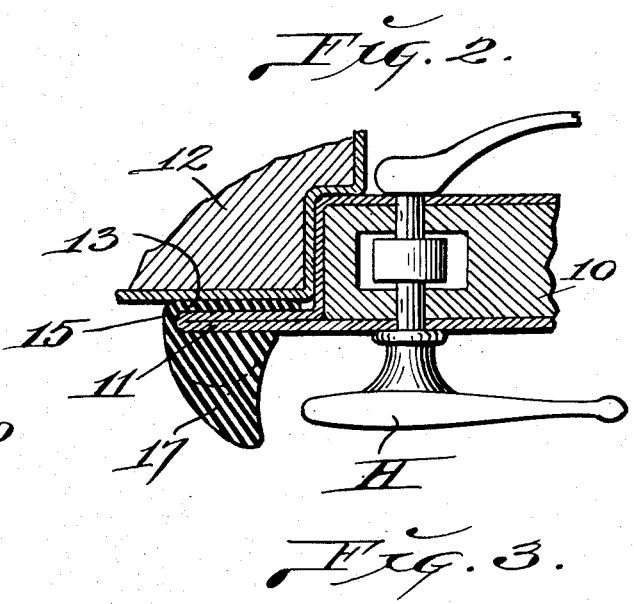
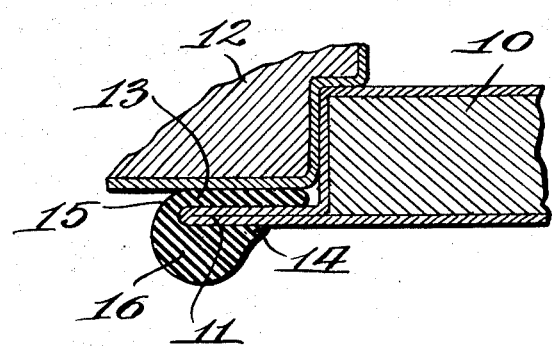
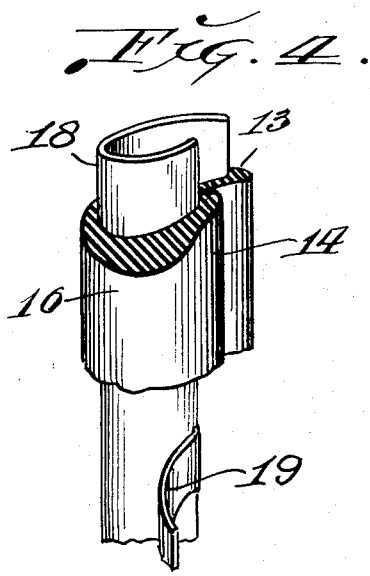
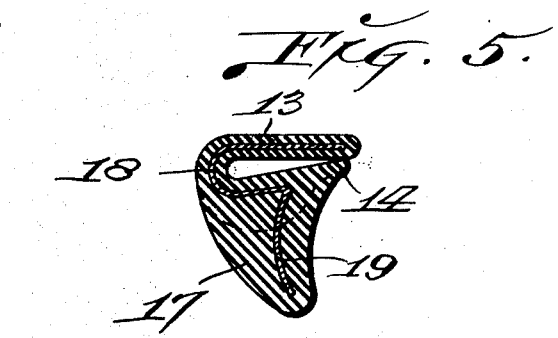
INVENTOR:—
DONALD P. KILLEN.
BY Martin P. Smith
ATTY.

Patented Dec. 31, 1940

2,226,615

UNITED STATES PATENT OFFICE 2,226,615

AUTOMOBILE DOOR BUMPER, SILENCER, AND DUST SEAL

Donald P. Killen, Glendale, Calif.

Application August 16, 1939, Serial No. 290,385

3 Claims. (Cl. 296—44)

My invention relates to attachments particularly designed for use on the free edges of automobile doors and has for its principal object, the provision of a relatively simple, practical and inexpensive attachment that may be easily and conveniently applied to the flange that projects from the free edge of the door and which overlies the door post and, which attachment is constructed so as to function as a bumper to prevent the door and the handle thereof from striking against and marring the body or fenders of an adjacent vehicle or the wall of a garage or the like and, said attachment also providing an air and dust proof joint between the edge of the door and the door post and, also functioning as a silencer inasmuch as it effectually prevents vibration and consequent rattling of the door when closed against the door post.

A further object of my invention is, to provide a combined bumper, silencer and dust seal, of the character referred to that may be reinforced with an embedded strip of thin resilient metal so as to give stability to the strip when the same is applied to the edge of the door and, likewise giving stability to the lug that projects from the strip for the purpose of guarding the handle of the door.

A further object of my invention is, to generally improve upon the construction of the class of devices to which my invention relates so as to increase their utility, durability and efficiency.

With the foregoing and other objects in view, my invention consists in certain novel features of construction and arrangement of parts that will be hereinafter more fully described and claimed and illustrated in the accompanying drawing in which:

Fig. 1 is an elevational view of a portion of an antomobile door and showing my improved bumper strip applied thereto.

Fig. 2 is an enlarged horizontal section taken on the line 2—2 of Fig. 1.

Fig. 3 is an enlarged vertical section taken on the line 3—3 of Fig. 1.

Fig. 4 is a fragmentary perspective view of a portion of the bumper strip having a resilient reinforcing member embedded therein.

Fig. 5 is a horizontal section of the form of strip that is provided with the embedded reinforcement and showing a portion of the latter extending into the lug that provides a protective bumper for the handle of the door.

Referring by numerals to the accompanying drawing which illustrates a preferred embodiment of my invention, 10 designates the door of an automobile and which door in accordance with conventional practice is provided on its free edge with a vertically disposed flange 11 which, when the door is closed, overlies a portion of the outer face of the door post 12.

The bumper strip contemplated by my invention is preferably formed of rubber or composition, of which rubber is one of the principal ingredients, and the main body of the strip comprises an inner member 13 and an outer member 14, said members being connected throughout the length of the strip by a substantially semi-circular web portion 15. When the strip is applied to the flange 11, the inner portion 13 lies directly against the inner face of said flange and the portion 14 overlies the outer face of the flange. The strip thus constructed may be secured to the flange 11 in any suitable manner, for instance, by means of an adhesive or by fastening devices such as screws or rivets (not shown).

Formed integral with the outer portion 14 of the strip adjacent the web 15 is an outwardly projecting rib or bead 16 that is formed of the same material from which the strip members 13 and 14 are formed and, this rib or bead functions as a cushioning bumper that will effectually prevent the marring or other damage to the finish of the door or fender of an adjacent automobile or where two automobiles are parked immediately adjacent each other and the door of either automobile is opened.

When the door is closed, the inner member 13 of the bumper strip provides an effective cushion to prevent vibration and consequent rattling of the door when closed and likewise said strip provides an air and dust proof joint between the flange 11 of the door and the door post.

In order to provide a protective bumper that will prevent the handle of the door from striking against an adjacent car, wall, or other fixed object, there is formed on the outer strip 14 an outwardly presented lug 17 which preferably tapers toward its outer end and, when the bumper strip is properly applied to the edge of the door this lug 17 occupies a position directly in front of the handle H of the door as illustrated in Figs. 1 and 2.

The length of the lug or projection 17 is such that its outer end occupies a vertical plane just beyond the outer face of the handle so that the latter is protected against contact with an adjacent car or object when the door that is equipped with the protective strip is opened.

In some instances it may be found desirable to embed in the portions 13 and 14 of the strip a reinforcing member 18 of thin resilient material such as sheet metal and, which member is substantially U-shape in cross section as illustrated in Fig 4 so as to conform to the cross sectional shape of the cushioning strip. Where the cushioning strip is provided with the reinforcing member, the outer one of the legs of said reinforcing strip or the leg that is embedded in the outer member 14 is provided with an outwardly projecting reinforcing plate 19 that is embedded in the lug 17 (see Fig. 5).

When the protective strip is produced, the inner and outer members 13 and 14 are disposed so that their free edges are immediately adjacent each other as illustrated in Fig. 5 and thus, when the strip is applied to the flange on the door it is necessary to separate the free edges of the parts 13 and 14 and such action sets up internal pressure that causes the parts 13 and 14 to hug and grip the flange to which the strip is applied.

Where the cushioning strip is reinforced with a metal strip 18 as illustrated in Figs. 4 and 5, the cross sectional shape of said reinforcing strip conforms to the shape of the cushioning strip and thus, the tendency of the strip to grip the flange when applied thereto is materially increased.

Inasmuch as the bumper strip includes a portion that occupies a position between the flange of the door and the door post when the door is closed, the device in addition to providing an effective protective bumper prevents annoying rattles that might otherwise arise from vibration of the door while the car is in operation and, the interposed member of the strip also functions as an air and dust tight joint between the door and door post.

Thus it will be seen that I have provided an automobile door bumper, silencer and dust seal that is relatively simple in construction, inexpensive of manufacture, capable of being easily and quickly applied to the flange on the free edge of the door and very effective in performing the functions for which it is intended.

It will be understood that minor changes in the size, form and construction of the various parts of my improved automobile door bumper, silencer and dust seal, may be made and substituted for those herein shown and described, without departing from the spirit of my invention, the scope of which is set forth in the appended claims.

I claim as my invention:

1. A bumper strip for the free edge of an automobile door comprising a strip of resilient material which is substantially U-shape in cross section, an integral rib projecting outwardly from one side of said strip and a lug of resilient material projecting outwardly from the side of the strip on which said rib is formed.

2. A bumper strip for the free edge of an automobile door comprising a strip of resilient material which is substantially U-shape in cross section, an integral rib projecting outwardly from one side of said strip, a lug projecting outwardly from the side of the strip on which said rib is formed, a reinforcing strip of thin resilient metal embedded in said bumper strip and a narrow reinforcing member projecting outwardly from the outer portion of said reinforcing strip, which narrow reinforcing member is embedded in said outwardly projecting lug.

3. The combination with an automobile door and the flange that projects from the free edge of said door, of a bumper strip of resilient material applied to said flange and overlying the inner and outer faces thereof, that portion of the strip that overlies the inner face of the flange providing a silencer and a dust seal, a rib formed integral with and projecting outwardly from that portion of the strip that overlies the outer face of said flange and a lug of resilient material projecting outwardly from that portion of the bumper strip that overlies the outer face of said flange.

DONALD P. KILLEN.